US008042193B1

(12) United States Patent
Piliouras (10) Patent No.: US 8,042,193 B1
(45) Date of Patent: Oct. 18, 2011

(54) SYSTEMS AND METHODS FOR CONTROLLING DATA ACCESS BY USE OF A UNIVERSAL ANONYMOUS IDENTIFIER (75) Inventor: Teresa A. Piliouras, Weston, CT (US)

(73) Assignee: Albright Associates, Waltham, MA (US)

( * ) Notice: Subject to any disclaimer, the term of this patent is extended or adjusted under 35 U.S.C. 154(b) by 0 days.

(21) Appl. No.: 12/146,257

(22) Filed: Jun. 25, 2008

Related U.S. Application Data (63) Continuation of application No. 11/726,308, filed on Mar. 21, 2007, now abandoned, and a continuation of application No. 11/638,226, filed on Dec. 13, 2006, now abandoned.

(60) Provisional application No. 60/788,264, filed on Mar. 31, 2006.

(51) Int. Cl.
G06F 17/30 (2006.01)

(52) U.S. Cl. ............... 726/28; 726/2; 726/5; 726/27; 713/169

(58) Field of Classification Search ............... 726/2, 28
See application file for complete search history.

(56) References Cited

U.S. PATENT DOCUMENTS

| 4,879,747 | A | 11/1989 | Leighton et al. |
| 5,475,826 | A | 12/1995 | Fischer |
| 5,694,471 | A | 12/1997 | Chen et al. |
| 5,768,519 | A | 6/1998 | Swift et al. |
| 5,855,008 | A | 12/1998 | Goldhaber et al. |
| 6,175,833 | B1 | 1/2001 | West et al. |
| 6,236,975 | B1 | 5/2001 | Boe et al. |
| 6,393,471 | B1 * | 5/2002 | Kobata ............ 709/221 |
| 6,778,807 | B1 | 8/2004 | Martino et al. |
| 6,941,271 | B1 * | 9/2005 | Soong ............ 705/3 |
| 6,959,281 | B1 | 10/2005 | Freeling et al. |
| 6,978,369 | B2 * | 12/2005 | Wheeler et al. ............ 713/170 |
| 7,003,669 | B2 | 2/2006 | Monk |
| 7,020,645 | B2 | 3/2006 | Bisbee et al. |
| 7,054,830 | B1 | 5/2006 | Eggleston et al. |
| 7,059,516 | B2 * | 6/2006 | Matsuyama et al. ......... 235/382 |
| 7,100,195 | B1 | 8/2006 | Underwood |
| 7,110,573 | B2 | 9/2006 | Monk et al. |
| 7,158,959 | B1 | 1/2007 | Chickering et al. |
| 7,225,977 | B2 | 6/2007 | Davis |
| 7,314,162 | B2 | 1/2008 | Carr et al. |
| 7,353,283 | B2 | 4/2008 | Henaff et al. |
| 7,568,098 | B2 * | 7/2009 | Yeates et al. ............ 713/171 |
| 7,640,336 | B1 | 12/2009 | Lu et al. |

(Continued)

OTHER PUBLICATIONS

Kuklinski Theodore, Automated Authentication of Current Identity Documents, Apr. 21 2004, IEEE, vol. 12, pp. 1-4.*

(Continued)

Primary Examiner — Nathan Flynn
Assistant Examiner — Viral Lakhia
(74) Attorney, Agent, or Firm — Lando & Anastasi, LLP (57) ABSTRACT A universal anonymous data collection and exchange service is provided where individuals and entities initially register with the service utilizing "legally authentic" identity documentation to obtain a "universal ID" (UXID). The UXID consists of a sting of alphanumeric digits selected from a hash function that is performed on a string of personally identifying information. Once registered, the individual and entity UXIDs are used as a means by the service to engage in a pre-defined confidential data collection and exchange protocol between participating, registered UXID holders. The service is designed for use across many applications, individuals and entities, and may support one-time or recurring collection of data.

23 Claims, 6 Drawing Sheets

U.S. PATENT DOCUMENTS

| | | | |
|---|---|---|---|
| 2001/0027472 A1* | 10/2001 | Guan | 709/203 |
| 2001/0054153 A1 | 12/2001 | Wheeler et al. | |
| 2001/0054155 A1 | 12/2001 | Hagan et al. | |
| 2002/0004935 A1 | 1/2002 | Huotari et al. | |
| 2002/0007303 A1 | 1/2002 | Brookler et al. | |
| 2002/0016734 A1* | 2/2002 | McGill et al. | 705/14 |
| 2002/0128908 A1 | 9/2002 | Levin et al. | |
| 2002/0143632 A1 | 10/2002 | Walter et al. | |
| 2003/0115151 A1* | 6/2003 | Wheeler et al. | 705/64 |
| 2003/0115459 A1* | 6/2003 | Monk | 713/168 |
| 2003/0132285 A1* | 7/2003 | Blancas et al. | 235/380 |
| 2003/0149781 A1 | 8/2003 | Yared et al. | |
| 2003/0172272 A1* | 9/2003 | Ehlers et al. | 713/170 |
| 2003/0189093 A1* | 10/2003 | Fujimoto | 235/382 |
| 2003/0200468 A1 | 10/2003 | Raley et al. | |
| 2003/0229783 A1 | 12/2003 | Hardt | |
| 2004/0002842 A1* | 1/2004 | Woessner et al. | 703/11 |
| 2004/0099731 A1* | 5/2004 | Olenick et al. | 235/380 |
| 2004/0128392 A1 | 7/2004 | Blakly, II et al. | |
| 2004/0189441 A1* | 9/2004 | Stergiou | 340/5.51 |
| 2004/0225887 A1 | 11/2004 | O'Neil et al. | |
| 2004/0230807 A1 | 11/2004 | Baird, III et al. | |
| 2004/0245330 A1 | 12/2004 | Swift et al. | |
| 2004/0250118 A1 | 12/2004 | Andreev et al. | |
| 2005/0027566 A1* | 2/2005 | Haskell | 705/2 |
| 2005/0044423 A1 | 2/2005 | Mellmer et al. | |
| 2005/0131756 A1* | 6/2005 | Benson | 705/11 |
| 2005/0131829 A1 | 6/2005 | Messina | |
| 2005/0144066 A1 | 6/2005 | Cope et al. | |
| 2005/0144482 A1 | 6/2005 | Anuszewski | |
| 2005/0154665 A1 | 7/2005 | Kerr | |
| 2005/0165643 A1 | 7/2005 | Wilson et al. | |
| 2005/0166233 A1 | 7/2005 | Beyda et al. | |
| 2005/0192863 A1 | 9/2005 | Mohan | |
| 2005/0197884 A1 | 9/2005 | Mullen, Jr. | |
| 2006/0075475 A1 | 4/2006 | Boulos et al. | |
| 2006/0085254 A1 | 4/2006 | Grimm, III et al. | |
| 2006/0086783 A1* | 4/2006 | Tredeau et al. | 235/379 |
| 2006/0157559 A1* | 7/2006 | Levy et al. | 235/380 |
| 2006/0173792 A1 | 8/2006 | Glass | |
| 2006/0271787 A1* | 11/2006 | DeYoung et al. | 713/176 |
| 2006/0282883 A1 | 12/2006 | Rosenberg et al. | |
| 2007/0061334 A1 | 3/2007 | Ramer et al. | |
| 2007/0067297 A1 | 3/2007 | Kublickis | |
| 2007/0067405 A1 | 3/2007 | Eliovson | |
| 2007/0130005 A1 | 6/2007 | Jaschke | |
| 2007/0174214 A1 | 7/2007 | Welsh et al. | |
| 2007/0233688 A1 | 10/2007 | Smolen et al. | |
| 2007/0255643 A1* | 11/2007 | Capuano et al. | 705/37 |
| 2008/0010352 A1 | 1/2008 | Donoho et al. | |
| 2008/0013700 A1 | 1/2008 | Butina | |
| 2008/0022414 A1 | 1/2008 | Cahn et al. | |
| 2008/0033740 A1 | 2/2008 | Cahn et al. | |
| 2008/0040216 A1 | 2/2008 | Dellovo | |
| 2008/0052244 A1 | 2/2008 | Tsuei et al. | |

OTHER PUBLICATIONS

R.Chandramouli, A new taxonomy for analyzing authentication process in smart card usage profiles, 2006, NIST, pp. 1-9.*

Chang et al., "Remote Password Authentication with Smart Cards", IEEE Proceedings, vol. 3, May 1991, pp. 165-168.

Communications of the ACM, Privacy and Security Myths and Fallacies of "Peraonally Identifiable Information" Jun. 2010, pp. 24-26, vol. 53. No. 06.

* cited by examiner

|  | Permanent-UXID | Expiration Date-UXID |
|---|---|---|
| Multiple UXIDs | Identity-Verified EA-UXID (e.g., School EA-UXID based on diploma and birth certificate) | Age and/or Address-Verified EA-UXID (e.g., "Proof of Age" EA-UXID based on driver's license) |
| Unique UXIDs | Identity-Verified UXID (e.g., Individual UXID or voting EA-UXID based on birth certificate) | Unemployment-Verified EA-UXID (e.g., High Level Identify Verification EA-UXID based on birth certificate and employer statement) |

SYSTEMS AND METHODS FOR CONTROLLING DATA ACCESS BY USE OF A UNIVERSAL ANONYMOUS IDENTIFIER

CROSS-REFERENCE TO RELATED APPLICATION

This application is a continuation of and claims the benefit of priority under 35 U.S.C. §120 to U.S. patent application Ser. No. 11/726,308, filed Mar. 21, 2007 entitled: "SYSTEM AND METHOD OF PROVIDING UNIQUE PERSONAL IDENTIFIERS FOR USE IN THE ANONYMOUS AND SECURE EXCHANGE OF DATA", which is incorporated herein by reference in its entirety and claims the benefit of priority under 35 U.S.C. §119(e) to U.S. Provisional Application No. 60/788,264, filed Mar. 31, 2006, which is incorporated herein by reference in its entirety, and claims the benefit of priority under 35 U.S.C. §120 to U.S. application Ser. No. 11/638,226 filed Dec. 13, 2006, which is herein incorporated by reference in its entirety and claims the benefit of priority under 35 U.S.C. §119(e) to U.S Provisional Application No. 60/835,834, filed Aug. 4, 2006.

TECHNICAL FIELD

The present invention relates to a system and method of providing unique personal identifiers for use in the anonymous and secure exchange of data and, more particularly, to the implementation of a trusted third party service to generate unique universal IDs (UXIDs) and utilize the UXIDs as the key to a repository of secure data associated with the individual.

BACKGROUND OF THE INVENTION

There is a widespread need for universal identifiers—database "keys"—to facilitate the collection, merger and exchange of data across broad-based populations and time scales. Within the United States, the Social Security Number (SSN) has become the de facto standard identifier that is used to associate data with a selected individual. However, since the SSN is so readily tied to the individual, use of the SSN as a database key poses the risk of privacy abuses, including but not limited to identity theft. Since the use of a universal identifier (such as the SSN) is often outside the knowledge or control of the person to whom the identifier is assigned, the potential for continued and ongoing misuse is significant.

Because individual privacy and confidentiality rights cannot be safeguarded with current approaches, governmental efforts to assign unique universal personal identifiers have met with significant legal opposition in the United States. For example, the National Center for Education Statistics (NCES) has proposed the introduction of "unit-level" data collection to allow for the aggregation of a variety of personally-identifiable data about students over the course of their education. Collection of comprehensive educational data is essential for informed decision and policy making, but attempts to implement mandatory national data collection via personally identifiable IDs have met with significant legal challenges, in additional to financial and logistical ones.

Many types of national, state and other initiatives have been under scrutiny and subject to cancellation because they are unable to collect and analyze the data needed to determine program efficacy and cost-effectiveness.

In general, universal identifiers and their use in the collection of personal and confidential data are currently prohibited or protected by a wide body of law, especially in legal, medical, educational and financial contexts. Many social, financial, medical and other types of applications share these types of difficulties and thereby lack the means for collecting data which is needed for rigorous evaluation and scientific investigation.

Thus, a need remains in the art for providing a universal process that may be used to confidentially collect and exchange data from a variety of sources for a variety of purposes.

SUMMARY OF THE INVENTION

The needs remaining in the art are addressed by the present invention, which relates to a system and method of providing unique personal identifiers for use in the anonymous and secure exchange of data and, more particularly, to the implementation of a trusted third party service to generate unique universal IDs (UXIDs) and utilize the UXIDs as the key to a repository of secure data associated with the individual.

In accordance with the present invention, a third party service is utilized to generate UXIDs that thereafter allow for the collection, aggregation and exchange of statistics and data in an anonymous fashion between various types of individuals and entities. A novel process has been developed to generate unique universal IDs based upon certifiable legal documentation (e.g., birth certificate), where the trusted third party service obtains the document, selects predetermined information therefrom and performs a "hash" on the selected information to generate the UXID.

Once an individual has subscribed to the service and obtained a unique UXID, the individual may thereafter request to be associated with various entity subscribers to the service (where the individual is then issued a unique entity-associated UXID, or EA-UXID, for each association request) so that various types of personal data will be available (in an anonymous fashion) to the subscriber-entity. For example, a student may have a school-entity UXID that is used to associate his/her school records with him/her regardless of where they live throughout their school years. This same student may have a medical-entity UXID that is used in similar fashion to link the student's personal medical records with him/her. In accordance with the present invention, the utilization of different EA-UXIDs for each entity registration prevents the school-entity subscriber from having access to the student's medical records, and similarly prevents the medical-entity subscriber from having access to the student's school records.

Various other types of entities (for example, governmental services, financial/banking services, etc.) may also subscribe to and use the data collection services of the present invention, particularly since the provision of UXIDs and EA-UXIDs is truly independent of the type of data collected, or the uses to which "trusted" subscriber-entities applies this collected, anonymous data.

In accordance with the present invention, individuals initially register with the service by submitting their birth certificate or other "legally authentic" document (such as required to obtain a passport) to obtain a "universal ID" (UXID). The service creates a string of selected information from the document, such as the individual's name, birth date and birth city, and performs a mathematical hash operation on this string (supplemented in the manner described below) to form a multi-digit hexadecimal result. A selected number of digits from the hexadecimal hash result (preferably, nine digits) is then defined as the UXID. It is a significant aspect of the present invention that an individual's UXID will never change over the individual's lifetime, so that the initial registration generates a UXID that will always remain linked with that person. In order to assure this result, the process of the present invention consistently utilizes the same data items from a birth certificate/legal document to generate the UXID. Therefore, if an individual loses or forgets his UXID, the inventive service may re-generate the UXID from the same birth certificate-based information used to generate the UXID in the first instance.

In the process of generating the UXID, a "pad string" known only to the service provider is appended to the supplied information (thus forming the supplemented string noted above), providing additional assurance that inappropriate third parties cannot hold themselves out as being associated with the anonymous data collection service of the present invention. The pad string is analogous to a "private key" in a (public key, private key) pair, and is known only by the service provider of the present invention. The service provider uses the pad string as an internal control for identifying fake IDs that might be generated by entities misrepresenting themselves as bona fide agents of the service. Different pad strings may be used to generate different entity-associated UXIDs and/or may be changed over time, with the service maintaining a linkage between all UXIDs/EA-UXIDs and the particular pad string used in their generation.

In accordance with the present invention, various accepted "one way" hashes may be used by the service to preserve the anonymity of the registered individuals, while insuring that the information remains secure. For example, the MD5 or SHA-1 hashes, well known in the art, may be used. Alternatively, a private, proprietary hash known only to the service provider may be employed, adding yet another degree of security to the process. Again, the UXID platform of the present invention is capable of retaining a linkage between each UXID/EA-UXID and the specific hash algorithm used for its generation.

The UXID platform of the present invention can further check the to-be-assigned UXID against already issued UXIDs in order to ensure that the proposed UXID has not already been assigned (i.e., that a "collision" was created by generating a hash of this new data). If a collision has occurred, the process will adjust one (or perhaps more) of the digits in the to-be-assigned UXID and again search the issued UXID database for collisions. This process would continue, as necessary, until the newly-formed UXID is "unique".

The generated UXID is then conveyed to the individual, preferably by mail, email or in person, along with the return of their original documentation (i.e., birth certificate), and an associated "secret user string" (SUS). The SUS is analogous to a PIN or password, and is thereafter utilized to permit/deny access of the individual to the UXID platform of the present invention.

Once registered, the individual's UXID is used to control their interactions with the trusted third party service of the present invention. As mentioned above, to safeguard UXID privacy and use, various "entity-application" UXIDs (EA-UXIDs) and EA-SUSs are thereafter issued to an individual for each specific entity to which he/she subscribes. As will be described in detail hereinbelow, an EA-UXID is created from a hash string derived from the individual's UXID and possibly other entity-related information. The act of registration also allows the inventive service to collect data associated with the individual, where the data may be supplied by participating entities (such as schools, banks, etc.)

Various embodiments of the present invention include the provision of a "verification level" (VL) assessment to be associated with a generated UXID/EA-UXID, which may be based upon the original documentation used to generate the ID. For example, if an individual does not have/cannot find his original birth certificate, and uses a valid driver's license to obtain a UXID, that UXID may be issued with a lower "verification" level, since a driver's license is not considered as "authentic" as an original birth certificate. In other embodiments, a "temporary" or "provisional" UXID may be issued, where the UXID includes an expiration date. Such a UXID may be required in situations where the individual has not yet obtained the required documentation, but needs the UXID for other reasons.

Other and further aspects of the inventive UXID system and method of the present invention will become apparent during the course of the following discussion and by reference to the accompanying drawings.

BRIEF DESCRIPTION OF THE DRAWINGS

Referring now to the drawings.

DETAILED DESCRIPTION

The generation and utilization of unique universal IDs (UXIDs) in accordance with the present invention is intended to be a third party service offered to individuals (as "sources" of collected data) and entities (as "users" of the collected data), albeit that individuals may also be "users" of the data in certain cases. The use of UXIDs allows for the collected data to be passed along in anonymous fashion to the entities, thus allowing various types of agencies, financial/educational/medical institutions, and the like, to perform vital services without compromising the identity of any individuals associated with the data. Some entities, for example, medical research programs or educational survey institutions are therefore able to collect and utilize significant, valid data in an anonymous fashion to provide services such as tracking individuals involved in a new drug trial, investor activity in different businesses, and the like.

As will be described in detail below, the system and method of the present invention begins with an individual subscriber obtaining a UXID in the form of a unique sequence of digits that is generated using a novel process and based on verified legal documents so that a correspondence between a UXID and only one individual is assured. The individual submits a legally-verifiable original document (or notarized copy thereof) to the service, where in most cases a birth certificate is the preferred documentation. A set of predetermined fields of information from the submitted document are then used to form a string of information. A hash algorithm is applied to this information string (supplemented in the manner discussed below) to generate a string of hexadecimal digits from which a subset of digits is selected to create the UXID. The UXID is thereafter used by the subscriber to set up their preferences and to make selections to participate in various entity applications (e.g., education, medical, financial, etc.). The UXID may also be used by the subscriber to monitor "activity" associated with their data, in terms of an audit trail of data collection/dispersement activities conducted on their behalf.

Entities, such as businesses, schools, private organizations and the like desiring to participate in an anonymous data exchange must also register with the service of the present invention. The entity registration involves the submission of consent and authorization forms, as well as other appropriate entity identification proof(s) that can be verified by the inventive service (and possibly confirmed by other third parties, if necessary). Specific identification proofs and documentation required for registration with the service may vary according to the type of entity and the nature of the anonymous data exchange protocol being employed by the service. In order to participate as a subscribing entity, various "officers" or other individuals associated with the entity must also apply for individual UXIDs, and further obtain EA-UXIDs, where these IDs will allow the registered individuals to request and collect data on behalf of their specific entity. Examples of an "entity application" may include tracking of student progression from kindergarten through college, tracking of unemployment benefits eligibility and participant usage, tracking of medical records and storage location, tracking of illnesses and cause of death for pedigreed animals, anonymous age verification, etc.

In order to be associated with a specific data-using entity (e.g., school, drug trial), an individual must also obtain an entity-application UXID (EA-UXID), and paired EA-SUS, that will be recognized by that specific entity and used to control the specific type of (anonymous) data transmitted to that entity. An "entity application" in accordance with the present invention refers to data which the inventive service collects on UXID subscribers for a particular purpose. More formally, an "entity application" is defined as a specific, pre-defined protocol of data collection and viewing for a set of entities and/or individuals.

Similar to the process of obtaining a passport, a critical component of the UXID service of the present invention is the submission of a tangible, physical document that may be separately authenticated by the service provider. While an "original" document may be submitted, it is also contemplated that a copy of a legal document that is accompanied by a notarized statement regarding its authenticity may be used. The provided data may be stored by the service provider in tabular form, as showed below in Table I for an exemplary individual "James Doe":

TABLE I

| Data Element | Value |
| --- | --- |
| First Name | James |
| Middle Name | NMI (no middle initial or name) |
| Last Name | Doe |
| Mother's First Name | Laura |
| Date of Birth | Jul. 1, 1980 |
| City of Birth | New Rochelle |
| State of Birth | New York |
| Country of Birth | United States |

The process of creating a unique UXID for James Doe based on this information then proceeds by formatting this data into a standard string (SS) form. One exemplary standard string that may be used by the trusted third party service of the present invention is shown below:

SS=James,NMI,Doe,Laura,July,01,1980,New_Rochelle, New_York,United_States, where the "underscore" character is used in each instance where a "blank" is required. It is to be understood that in its most general implementation, a subset of these data element values may be used to form the standard string (for example, "mother's first name" may be omitted from the standard string). The arrangement as shown above is considered as exemplary only. The next step, in accordance with the present invention, is to append a "pad string" to the standard string. The inclusion of a "pad string" known only by the UXID service provider avoids the creation of "false" IDs by an untoward individual holding himself out as providing this ID service. As mentioned above, the pad string can be likened to a "private key" in a (public key, private key) pair. For the purposes of explanation, it is presumed that the UXID service is currently using the pad string: UXIDSecretPadString, appending this string to that shown above to form the complete string:

James,NMI,Doe,Laura,July,01,1980,New_Rochelle, New_York,United_StatesUXIDSecretePadString It is to be understood that the particular "pad string" used the by UXID service may be changed periodically to further limit the possibility of the UXIDs being compromised. As explained below, the UXID platform of the present invention maintains an association between a created UXID and the particular pad string used in its generation, so that the UXID can be re-created, if necessary.

A key step in the formation of a unique, verifiable UXID is to generate a one-way hash of the complete string, where a portion of the hash is then defined as that individual's unique UXID. Exemplary well-known hashes that may be used for this purpose include, but are not limited to, MD4, MD5 and SHA-1. The following discussion will utilize the MD5 hash to generate the translated string only for the purposes of further explaining the additional attributes of the present invention. For the complete string as shown above, the resultant MD5 hash is the 32 hexadecimal digit number shown below:

39def8211 dba37211f46a73bd81f129d

Obviously, such a random appearing 32 digit number is too long to be remembered by James Doe and would thus not be acceptable for use as a UXID that needs to be remembered and used on a regular basis. The number of possible permutations of this string is $16^{32}$—a significant indication that such a long string would be "overkill" in providing a secure ID. The following Table II lists the possible number of permutations that may be represented by "n" hexadecimal digits, for values from n=1 to n=14:

TABLE II

| "n" | Permutations |
| --- | --- |
| 1 | 16 |
| 2 | 256 |
| 3 | 4096 |
| 4 | 65,536 |
| 5 | 1,048,576 |
| 6 | 16,777,216 |
| 7 | 268,435,456 |
| 8 | 4,294,967,296 |
| 9 | 68,719,476,736 |
| 10 | 1,099,511,627,776 |
| 11 | 17,592,186,044,416 |
| 12 | 281,474,976,710,656 |
| 13 | 4,503,599,627,370,500 |
| 14 | 72,057,594,037,927,900 |

Seven digits (n=7) represents approximately the total population of the United States, and eight digits (n=8) represents approximately the world's population. For the purposes of the present invention, either of these two values would probably suffice. In order to provide an even greater degree of security than required for the foreseeable future, the value of nine digits (n=9) will be utilized for the preferred implementation of the UXID service of the present invention. Thus, for a particular embodiment of the present invention, the last nine digits of the MD5 hash string will be defined as James Doe's UXID. That is, recalling that the MD5 hash created by James Doe's personal information is as follows:

39def8211dba37211f46a73bd81f129d, the string "bd81f129d" (the last nine digits as indicated by the "bold" typeface) will be sent to James Doe (presumably through the mail, or other secure method of transmission) as his personal UXID. For the ease of remembering this string, it may be broken into its triplet form: "bd8 1f1 29d". Since any slight modification of the input data (for example, the inclusion of a middle initial for Mr. Doe) will significantly change the hash result, it is a valid presumption that the nine digits generated for the UXIDs requested by a large number of individuals will all be unique.

To provide further assurance of "unique-ness" of the assigned UXID, the verification service of the present invention may first check the to-be-issued UXID against all previously-issued values. If a "match" is found (oftentimes referred to as a "collision" in the encryption arts), the UXID (in the form of, for example, a 9-digit hexadecimal number) may be incremented (or decremented) by 1, and the modified UXID again checked; with this process continuing until a truly "unique" UXID can be assigned and issued to James Doe. It is considered that the possibility of a collision will be rare, but if such an event does occur, the simple increment/decrement solution is available.

While this particular example utilizes the last nine digits of the hash, it is to be understood that any pre-defined set of nine digits (or other desired number of digits) may be used. For example, the first nine digits may be used to form the UXID, or the first five digits and the last four digits, or any other combination as dictated by the service provider.

When the UXID value is communicated to James Doe, the UXID service of the present invention will also provide a "secret user string" (i.e., password, and hereinafter referred to as an "SUS") that James Doe must use in conjunction with his UXID to gain access to the service platform and access the types of activities associated with his stored data. The number of bytes used to encode the SUS will depend upon the security requirements of the UXID service provider. For example, a high security application might require a secret string of 1024 bytes, while a less secure application may need a secret key that is only 64 bits long. In this case, the keys can either be encoded as 16 hexadecimal digits (4 bits/character) or as 11 printable ASCII characters (6 bits/character). It is presumed that an SUS as used in accordance with the present invention might need to be entered only once into a crypto key-ring (such as are available on personal computers running the Linux operating system) or other device (e.g., smartcard) for easy storage and use. For the purposes of the present invention, it is presumed that the SUS "nobodyknows" is sent to James Doe to be used in conjunction with his UXID. Importantly, the UXID service provider stores the UXID/SUS pair in its database of registered individuals, where these values are later retrieved (as will be discussed in detail below) in each instance where an individual desires to gain access to the UXID platform.

Figure 1:
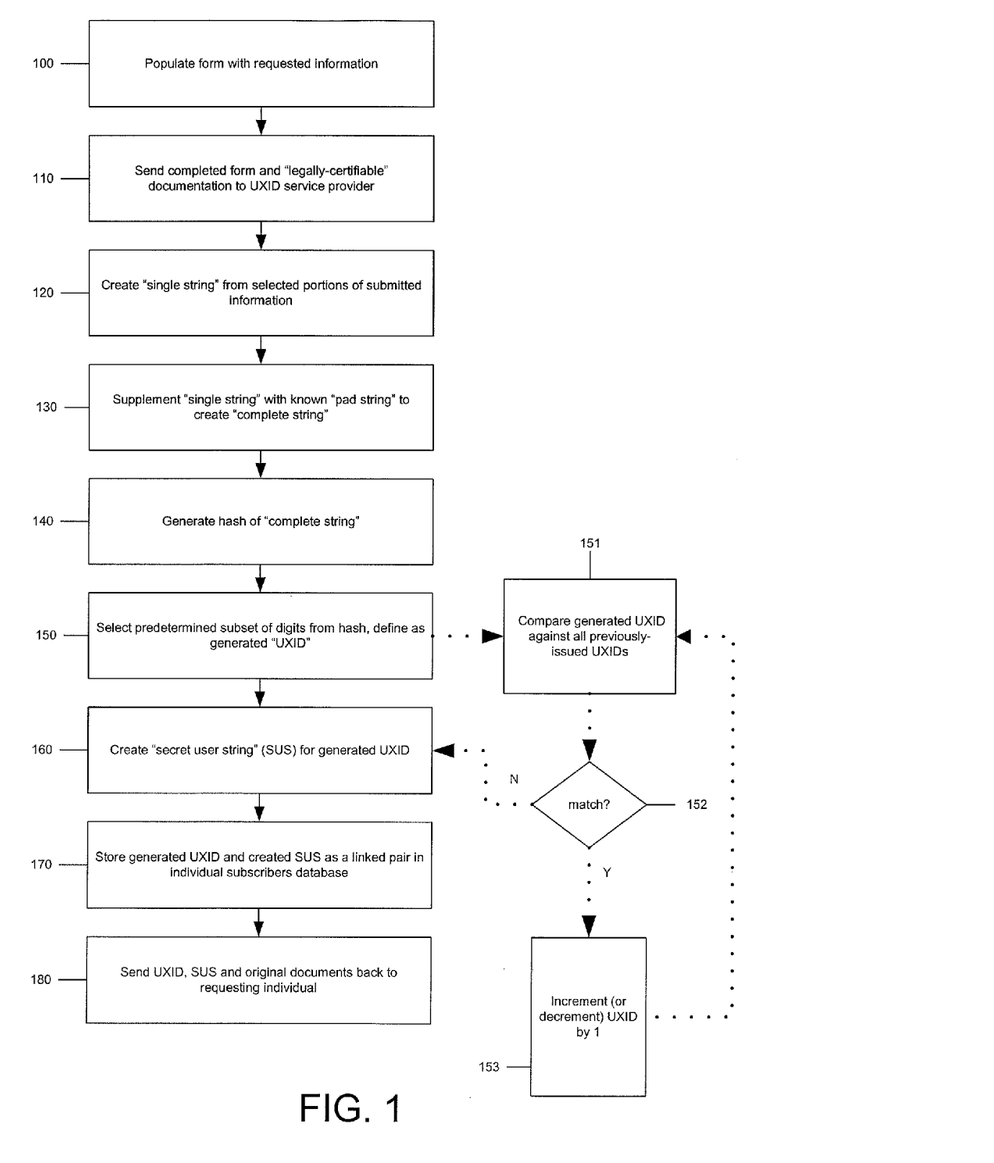
FIG. 1 contains an exemplary flowchart summarizing the process of obtaining a unique UXID in accordance with the present invention.

FIG. 1 contains an exemplary flowchart summarizing this process of obtaining a unique UXID as outlined above. As shown, the process begins with the individual completing a form (template) of the required information (step 100). The completed form and a "valid" certification document (preferably, an original birth certificate, passport, or the like) are then sent to the UXID service provider (step 110). Presumably, the form and associated documentation is sent by mail (certified mail or the like) or personally delivered to an office of the UXID service provider. A "standard string" (SS) is then created from selected portions of the submitted information, where the selection is at the discretion of the UXID service provider (step 120). A "pad string" that is known only to the UXID service provider is then appended to (or prefixed to, as the case may be) the SS to form a complete string (step 130). A hash is then performed on the complete string to generate a relatively long hexadecimal result (step 140), with a predetermined number of digits from the hash defined as the UXID for the individual (step 150).

The "secret user string" (SUS) is then assigned to the generated UXID (step 160), and both the UXID and SUS are stored in a UXID database under the control of the UXID service provider (step 170). The generated UXID, SUS and original birth certificate (or other form of submitted authentication) are then delivered to the requester (step 180). It is presumed that some type of mail/direct delivery service is used to send the information to the requester.

In one preferred implementation of the present invention, a generated UXID may be first checked against all previously-issued UXIDs to ensure that a "collision" will not occur (that is, that the same UXID is sent to two different individuals). As mentioned above, one intention of the present invention is that the UXID will be unique to each registered individual. The flowchart of FIG. 1 contains an additional set of steps 151-153 that may be used to provide a collision check prior to assigning a UXID. As shown, once a UXID has been generated in step 150, the process can move to step 151, which will then compare this generated UXID against all other previously-issued UXIDs stored in database 14. Step 152 is used to check for a "match". If there is no match, the process returns to step 160, and an SUS is created for the UXID. Alternatively, if there is a match, the process moves to step 153, which then increments (or decrements) the generated UXID by one and returns to step 151 to perform a comparison of the modified UXID against the database. This process of comparing will continue until a UXID is created that does not "collide" with any of the previously-issued UXIDs.

Figure 2:
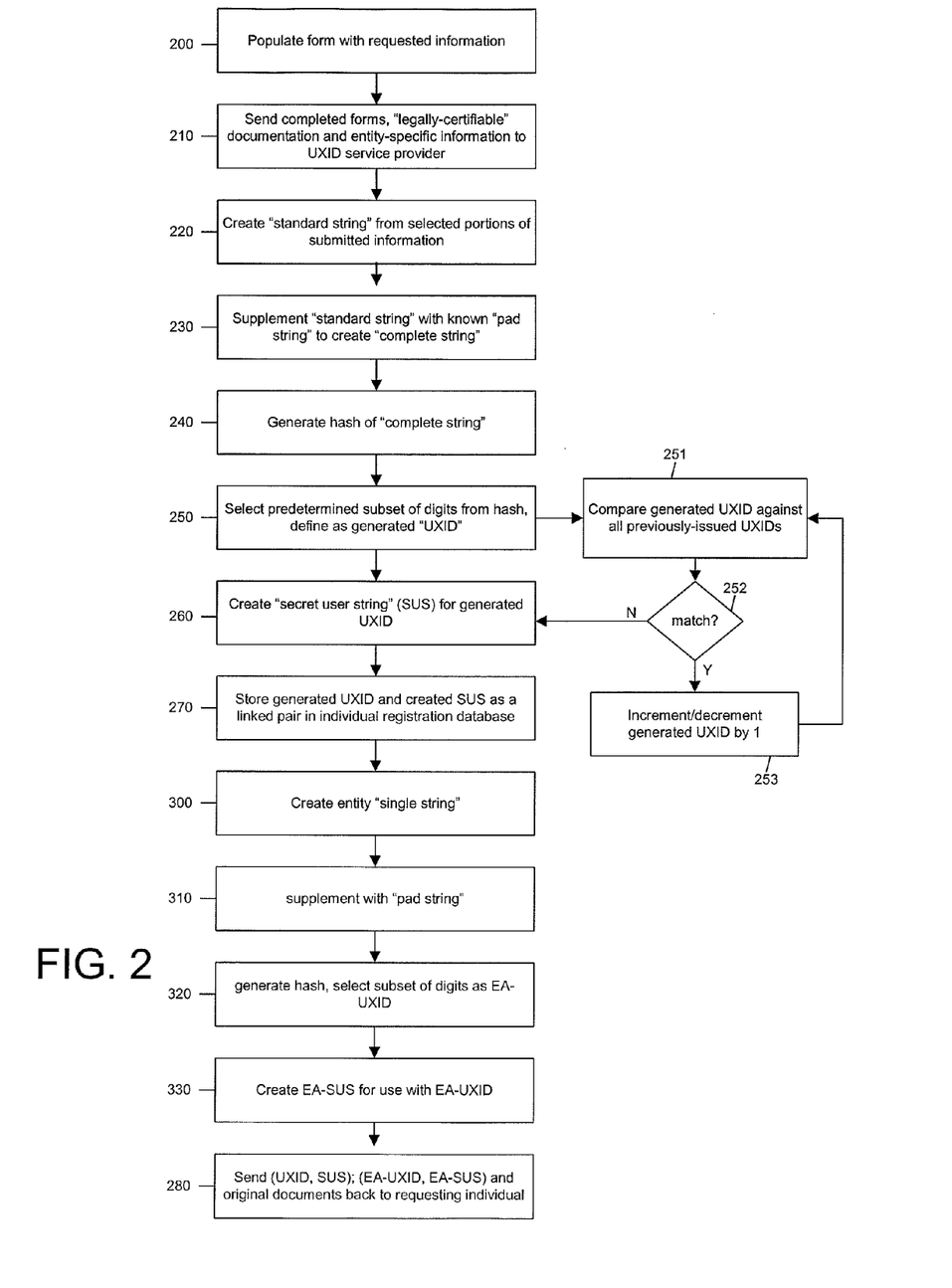
FIG. 2 contains a flowchart of the specific process used for entity registration.

As mentioned above, each entity that wishes to use the data collection services of the present invention must also register with the service, obtaining a separate UXID and EA-UXID for each authorized representative of the entity. A process similar to that outlined above is used to form the UXIDs, where the flowchart of FIG. 2 illustrates the specific process used for entity registration. In this case, the process begins at step 200 with the "entity" populating the registration form with the requested information. Beyond the submission of a birth certificate for each individual entity representative to be enrolled, the entity application form requests further legally-verifiable documentation that associates the individual with the particular entity requesting registration (for example, school ID number, medical license number, etc.). Moreover, an entity registration may define different levels of access rights to be associated with different ones of the individuals being registered. For example, in the educational environment, a school district superintendent may be given a priority level allowing access to all school records associated with his/her district, while a state's Secretary of Education may be given access to all public school records in that state. It is an aspect of the present invention that the information stored in association with each registered individual can be used to control the various level(s) of information that the individual may access. This particular aspect of the present invention will be discussed in more detail hereinafter.

Returning to the flowchart of FIG. 2, once all of the pertinent information has been collected, the completed application form and various documents supporting the association of each individual with the registering entity are sent to the inventive UXID service platform (step 210). The inventive service then proceeds in the manner outlined above in FIG. 1 to create a separate, unique UXID for each individual associated with the entity (steps 220-280). This process presumes that the various individuals have not previously obtained a UXID for other reasons. If one or more individuals to be associated with a registering entity already has a valid UXID, this portion of the process may be skipped, moving ahead to step 300, the generation of a specific EA-UXID for that individual that will be linked to the registering entity.

Referring to the flowchart of FIG. 2, the next step in the process is to create a unique EA-UXID for each individual representing the registering entity. In general, the process of creating an EA-UXID is identical to that used in the creation of the UXID in the first instance. Differences lie in the selection of the information used to form the "standard string", as well as in the documentation required to be submitted with the completed form in the first instance. Step 300 begins this portion of the process by creating a single string that incorporates entity-specific information, along with personal information as used to form the initial UXID. At step 310, this entity-specific standard string is supplemented by a "pad string", preferably a different pad string than that used to create the UXID, where this pad string may be linked with the entity in some manner. As before, a hash is performed on this string and a subset of digits is selected as the EA-UXID for this individual (step 320), to be used only to gain access to collected data in accordance with the established protocols of that entity. An entity-application "secret user string" (EA-SUS) is created for this EA-UXID (step 330) and, ultimately all of the registration information is returned to the entity performing the registration, The returned information (step 280) includes both the individual UXID/SUS, as well as the EA-UXID/EA-SUS.

Figure 3:
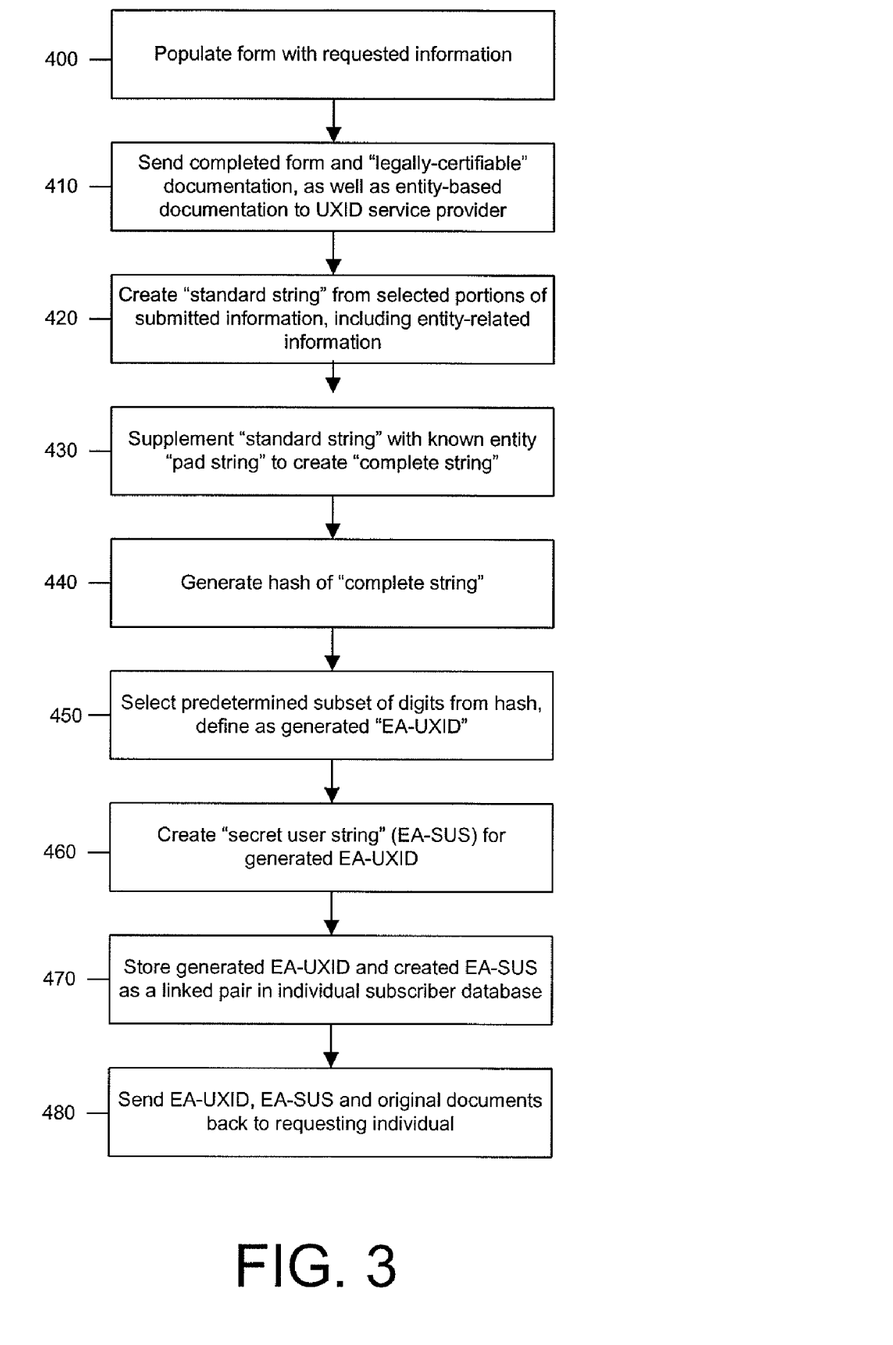
FIG. 3 illustrates the process of obtaining an EA-UXID in accordance with the present invention.

In accordance with the present invention, an individual must also register with each separate entity (who must be a previously-registered entity) to whom the individual will permit access to personal data. One foreseen embodiment is in the educational context, where a child will be registered with an educational entity so that his/her personal school records will "follow" that child throughout the complete educational process from kindergarten through twelfth grade, and possibly further on. FIG. 3 contains a flowchart outlining one exemplary process for creating an EA-UXID for an individual in accordance with the teachings of the present invention.

As mentioned above, the process of creating an EA-UXID is identical to that used in the creation of the UXID in the first instance. Differences lie in the selection of the information used to form the "standard string", as well as in the documentation required to be submitted with the completed form in the first instance. Referring to the flowchart of FIG. 3, the process of obtaining an EA-UXID begins with the individual populating the registration form with the requested information (step 400) and sending the completed form and additional documentation (in the case of an educational institution, for example, an initial enrollment form) to the UXID service provider (step 410). The UXID service provider then creates a "standard string" from this information (step 420), which may be a different set of items than those used to create the original UXID. For example, an educational EA-UXID may use a standard string incorporating the name of the school district where the individual first registers for kindergarten. Using the same James Doe example as above, and presuming that James attended the Springfield School District in New Rochelle, the "standard string" for his EA-UXID could be:

SS=James,NMI,Doe,Laura,July,01,1980,Springfield_School_District

As before, the standard string is supplemented with a "pad string" for extra security (step 430) and a hash process is performed (step 440) to generate a hexadecimal transformation of this string. The EA-UXID assigned to James Doe is selected from this string (step 450) and forwarded, along with an associated SUS (460), to James Doe (step 480). The transmitted EA-UXID/SUS pair is stored at the UXID platform (step 470), within the individual registration partition. Although not shown in FIG. 3, the same "collision" process may be used to check the to-be-assigned EA-UXID value against all values previously generated.

Figure 4:
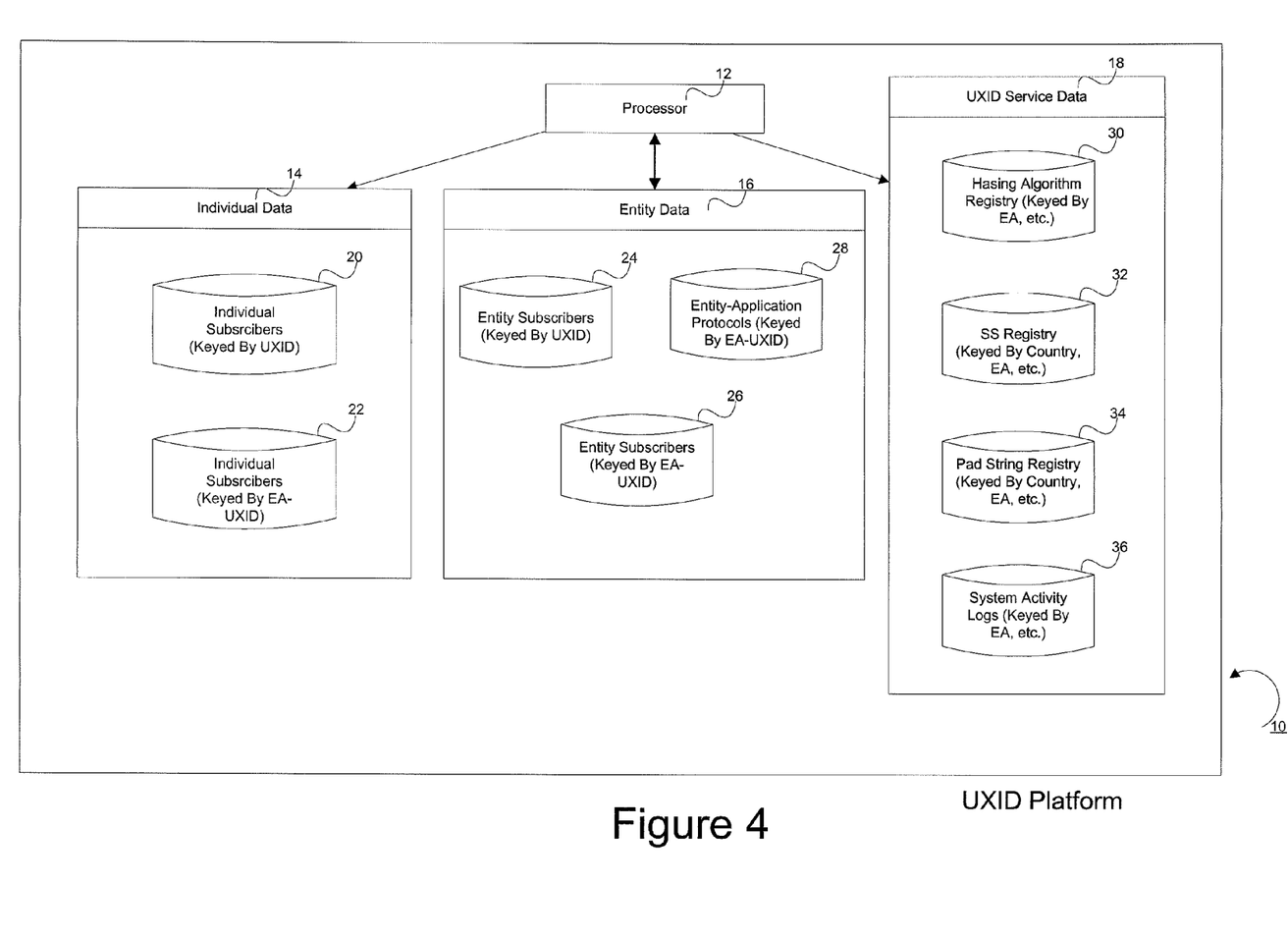
FIG. 4 is a simplified block diagram of an exemplary UXID platform utilized to provide the generation and utilization of UXIDs and EA-UXIDs in accordance with the present invention.

FIG. 4 contains a simplified block diagram of an exemplary UXID communication platform 10 that may be created and used by the trusted third party information service provider of the present invention. As shown, UXID platform 10 includes a processor 12 that performs the various hash functions as required to generate all of the UXIDs and EA-UXIDs offered by the service of the present invention. Also included within UXID platform 10 is an individual data partition 14, an entity data partition 16 and a UXID service partition 18. Individual data partition 14 includes, in this particular embodiment, a first database 20 of individual subscriber data, where the initially-generated UXID is utilized as the "key" to access an individual's particular data record. The individual SUS is stored as a linked pair with the generated UXID to limit access to only the individual in possession of both the UXID and the SUS. Standard security precautions—such as not storing the SUS but the MD5 hash of the SUS—may also be used. Also included in individual partition 14 is a second database 22 of the individual data, in this case keyed by the various EA-UXIDs that have been issued to registered individuals subsequent to the initial UXID enrollment.

Entity data partition 16 includes similar information as found in individual partition 14, in this case collected and utilized for each registered entity. A first database 24 includes a listing of all registered entities, keyed by their assigned UXIDs. Since an entity may have several different types of data that may be collected and used for different reasons (e.g., an insurance company may have a first set of data associated with insured individuals and a second set of data associated with drug trial studies), an entity may also have several different EA-UXIDs, which are stored (in pairs with their SUSs) in an entity EA-UXID database 26. The various established rules (protocols) associated with data collection and manipulation for each registered entity is stored in a separate protocol database 28, as shown, where protocol database is keyed by the various EA-UXID. In general, the protocol defines one or more of the following:

Specification of data format and coding conventions for all data collected by the inventive trusted third party service on behalf of the entity;

Methods of data collection used by service and entity (if applicable);

Sources and frequency of data collection;

Policy and usage restrictions with respect to the collection and viewing of data by entity representatives;

Lists of authorized entity representatives and associated access rights to view or change data;

Specification of "Study Group" assignment rules and designations;

Other particulars which may vary depending on the Entity-Application requirements.

The ability to track and report on "Study Groups" is a special feature of the service of the present invention. A Study Group may be defined for any group of entities and/or individuals which possess features of interest. Certain standard study groups (e.g., students in the expected graduating class of 2009 from Anytown High School, etc.) may be automatically assigned to participants in selected Entity-Applications supported by the service (such as School Entity-Applications designed to track student graduation rates and student movement between schools).

The UXID service data partition 18 is utilized to store and track the various elements associated with the generation of UXIDs and EA-UXIDs. In this particular embodiment, service data partition 18 includes a hashing database 30 that stores an association between a generated UXID and the particular hash algorithm used to generate it in the first instance. As mentioned above, there are various well-known hash algorithm (as well as proprietary algorithms) that may be used, and in fact different algorithms may be used as desired, since database 30 will retain the identity information of the selected hash for a particular UXID/EA-UXID. A single string database 32 is also included within service data partition 18 and is utilized to store a definition of the original individual information "fields" used to create the standard string. Examples of the "standard string" for the UXID and an educational EA-UXID have been given above. Further, since the service of the present invention may be utilized worldwide, the "standard string" used to create UXIDs for citizens of another country may use a different collection of information than that presented above for use in the United States, and may even use a different character set (e.g., Unicode) than the conventional ASCII code utilized in the United States. Single string database 32, therefore, will maintain a record of this information so that, if necessary, a UXID or EA-UXID may be re-generated.

As mentioned above, the pad string utilized to form the complete string from which the UXID or EA-UXID is generated is preferably changed over time (for security reasons). Thus, a pad string database 34 is included within service data partition 18 to maintain the association, for historical purposes, of the specific pad strings that have been used to generate each specific type of UXID and EA-UXID. A separate activity log 36 may be included within service data partition 18 and used by the trusted third party service to keep track of the various types of searches and data requests that have been undertaken over a given period of time.

There exist many variations in the ways in which the trusted third party data collection system of the present invention may be implemented. Besides the generation of initial UXIDs and EA-UXIDs as mentioned above, various classifications of these identifications can be defined as being either "permanent" or bearing an expiration date (i.e., temporary); or can be defined by a "verification level" that is ascribed to a particular ID. An "expiration date" UXID refers to an identification issued by the inventive service that has a pre-defined expiration date, and may need to be re-issued periodically based upon the submission of updated identity proof. As an example, the trusted third party service may issue an EA-UXID to an individual upon qualification for unemployment benefits. The EA-UXID may be used by a state Department of Labor (i.e., the "registered entity") to administer and track unemployment benefits, payouts and participant eligibility. In this scenario, individual and employer subscribers might submit documentation to the service that establishes not only the individual's identity, but also their unemployment status and benefit eligibility at a particular point in time. If, for purposes of illustration, the individual is entitled to 26 weeks of unemployment benefits, an expiration-date EA-UXID might be issued that expires at the end of this 26 week period. The service would then provide the state entity with the details of the individual's unemployment EA-UXID and associated data. Of necessity, the EA-UXID used for unemployment tracking and related purposes would be unique and issued only once to avoid the possibility of duplicate payments by the state.

In another variation of the ID service of the present invention, a "temporary" UXID or EA-UXID may be generated for use by a specified entity until such time as the inventive service can complete all of the verification processing needed to issue a fully-authorized UXID or EA-UXID. For example, an entity such as a school may be authorized to issue provisional UXIDs and EA-UXIDs to incoming students who do not have immediately available the requisite identification information required to participate in the school's entity application. Provisional processing of IDs at the school allows the service to collect data on students as soon as they are enrolled. Once the student's information has been verified, all of the required subscriber data that has been captured is stored within the individual database and a permanent EA-UXID is issued.

Figure 5:
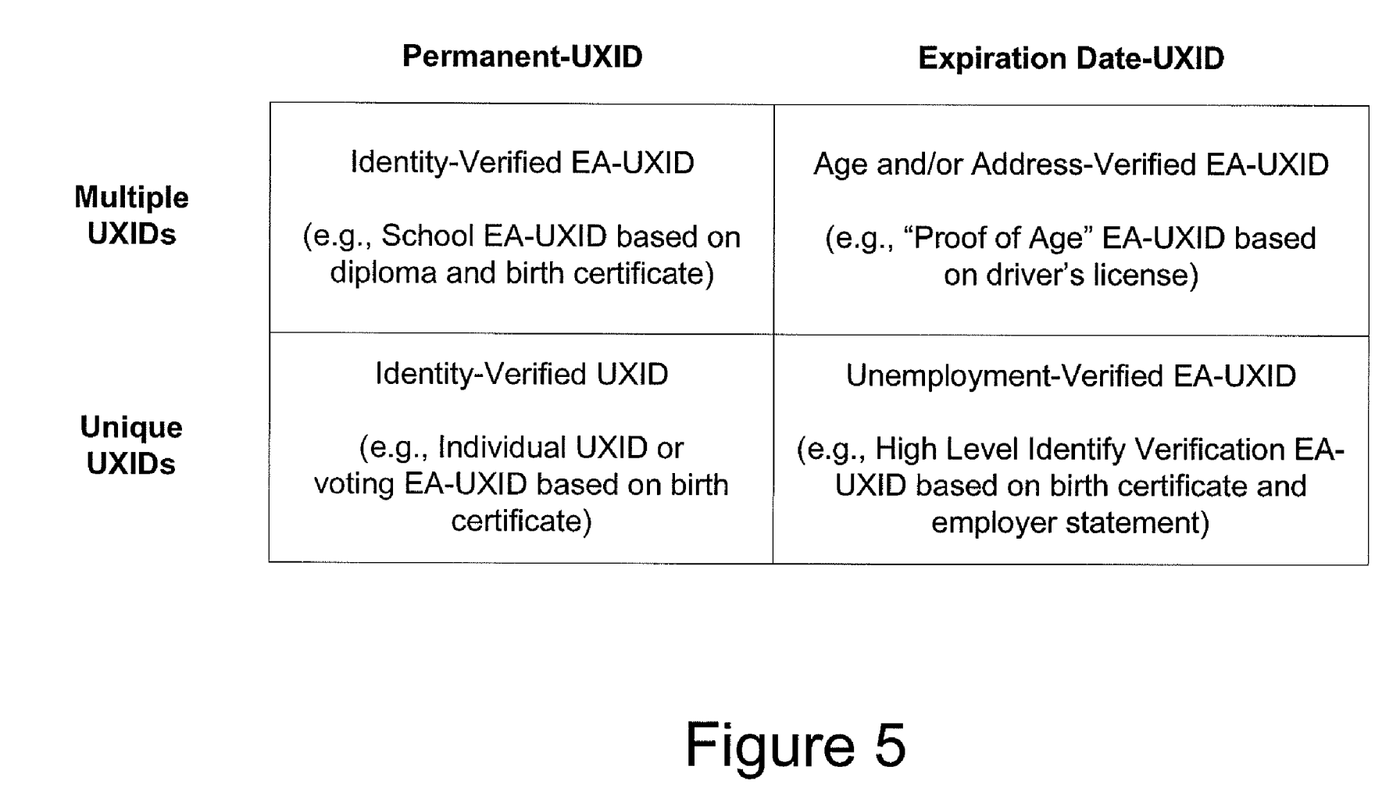
FIG. 5 contains a tabular depiction of the various types of UXIDs that may be generated in accordance with the present invention.

FIG. 5 illustrates, in tabular form, the various types of UXIDs and EA-UXIDs as described above. The table of FIG. 5 includes four separate categories of IDs, defined as either "multiple UXIDs" or "unique UXIDs", and "permanent UXIDs" or "expiration date UXIDs". Combinations of multiple/unique with permanent/expiring leads to the four specific groupings of IDs.

In a preferred embodiment of the present invention, the trusted third party service may also assign a "verification level" (VL) to UXIDs based upon the type of identity document submitted by the applicant. The VL represents the level of confidence that the individual requesting the UXID has accurately represented their true identity to the service. For example, a sworn affidavit signed by the individual application might be weighted as less credible than an original birth certificate. Additionally, some characteristics may be more easily verified than others by various third parties. Thus, the presumed veracity of the presented identification documentation and the ability to which it can be verified independently may be used to assign a ranking to the UXID credibility. Thus, the inventive service may assign a graded VL to each UXID (e.g., very high, high, moderate, etc.). Alternatively, the VL may simply refer to the number of separate identity documents that the individual has supplied to the service. For example, suppose Susan Doe presents a driver's license to obtain a UXID, while John Smith presents a birth certificate, passport and military ID. The inventive service may assign a VL of "moderate" to Susan's application, while assigning a VL of "very high" to John's application. In some cases, an individual may be able to upgrade the VL assigned to his/her UXID by submitting additional documentation.

A major use of the UXID service of the present invention is to provide a means for anonymous data collection. The trusted third party service of the present invention may collect data from a variety of sources including, but not limited to, individuals, entities, other third parties, or the service itself. With respect to the latter, the service may generate data through the creation of enrollment records keyed by UXID/EA-UXID. Enrollment records may be used to capture associations between individuals, entities and their respective participation in various entity applications. After the service creates enrollment records, it may further augment them using data obtained from other, independent third parties, both public and private. A set of partial sample enrollment records is shown below in Table III:

TABLE III

| Student | School | Term | Year | Action | Grade |
|---------|--------|------|------|--------|-------|
| 1e97b8d4f | 8ad874294c | fall semester | 1994-1995 | enrolled | 6 |
| 1e97b8d4f | 8ad874294c | fall semester | 1994-1995 | complete success | 6 |
| 1e97b8d4f | 8ad874294c | spring semester | 1994-1995 | enrolled | 6.5 |
| 1e97b8d4f | 8ad874294c | spring semester | 1994-1995 | graduation (elementary) | 6.5 | where it is shown in this record that this particular student successfully completed the sixth grade during the 1994-1995 school year at a given school, and graduated at the end of the spring semester.

For example, various sources of government-complied data include comprehensive school data obtained from the NCES website, census data collected by federal representatives every ten years, statistical health data maintained by the CDC, etc. Entities may provide data directly to the inventive service. As an example, if schools so elect at registration time, they have the option of providing the service with their own student IDs (which may be used within the school's own proprietary enrollment system), where the service can then utilize these IDs in place of the created EA-UXIDs when presenting collected data to school representatives, since a one-to-one mapping can be performed between each student's in-house ID and their issued EA-UXID.

The system of the present invention may also be used to provide subscribers (both individuals and entities) with information on where their records are stored for various entity applications. That is, a "record locator" function within UXID platform 10 can be used to help students locate their school records. In a medical context, the service might be used to locate every pharmacy where a certain individual has prescriptions filled.

The completeness of the record search is dependent upon having all of the parties involved in the record creation registered with the service in the first instance. For example, if a UXID subscriber wants information on where they fill prescriptions, each pharmacy they to go must be a registered entity. Further, each time a pharmacy fills a prescription, a record of the transaction should be created with the inventive service. The actual data collected to record the transaction is determined based upon the entity application requirements and the data collection/exchange protocols for that entity as stored within data base 28 at UXID platform 10. Participating pharmacies would continue to maintain their own proprietary databases to record details of each transaction. In using the inventive service, a pharmacy might request a record search if a batch of medication is recalled, so that the affected individuals can be quickly contacted.

Depending on the entity application, the inventive service may require further consent authorization before record searches are performed. This may be needed to comply with privacy, legal, ethical and possibly other requirements. To this end, the subscriber may be required to submit identity documents (such as passport, birth certificate, signed authorization form, etc.) to verify that he/she is the person associated with the UXID/EA-UXID and has properly authorized the record search.

The service may provide anonymized data to UXID subscribers in the form of reports or data extract files. In accordance with the present invention, data confidentiality is achieved in part through the service's use of UXIDs and EA-UXIDs. Knowledge of an entity or individual UXID/EA-UXID does not provide access to the service. An individual or entity (authorized representative of an entity) may only view UXID service account information with the correct UXID/SUS or EA-UXID/EA-SUS combination. With respect to individual subscribers, they must be properly authorized by both the entity and the service to access system data or review reports collected for the entity.

Data extracts and reports may be aggregated at various level of detail (for example, at an individual level (e.g., student); at an entity level (e.g., school); at a larger entity level (e.g., state school level); or an entity-application level (e.g., specific school program data, such as money spent on after-school programs). The service of the present invention may transform individual and entity EA-UXIDs at each level of aggregation so they cannot be compared against EA-UXIDs attached to records at other levels of aggregation. Thus, each level of data aggregation may permit a different "view" of the EA-UXIDs (which are used as entity and individual record keys). This transformation ensures that the EA-UXIDs remain anonymous.

An EA-UXID that has been transformed for a particular aggregation view is thereafter denoted as EA-UXID-n where "n" refers to the level of aggregation. An EA-UXID-n may use or less digits than UXIDs and EA-UXIDs so as to preserve the confidentiality of data when it is shared among subscribers. The EA-UXID-n may replace all instances of the EA-UXIDs in various reports and/or data extracts which the service distributes to subscribers so there is no way to correlate the ID used at one level of viewing with another merely by looking at the IDs. The transform of an EA-UXID into an EA-UXID-n simultaneously preserves data confidentiality, data integrity and consistency in database coding. By providing local views of the EA-UXID that change depending on use, it is statistically improbable (with a high level of confidence) that any party can successfully deduce the identity of a particular subscriber contained in a system report or database, or to correlate a given view of the subscriber with another view of that subscriber which is coded with a different EA-UXID-n.

Figure 6:
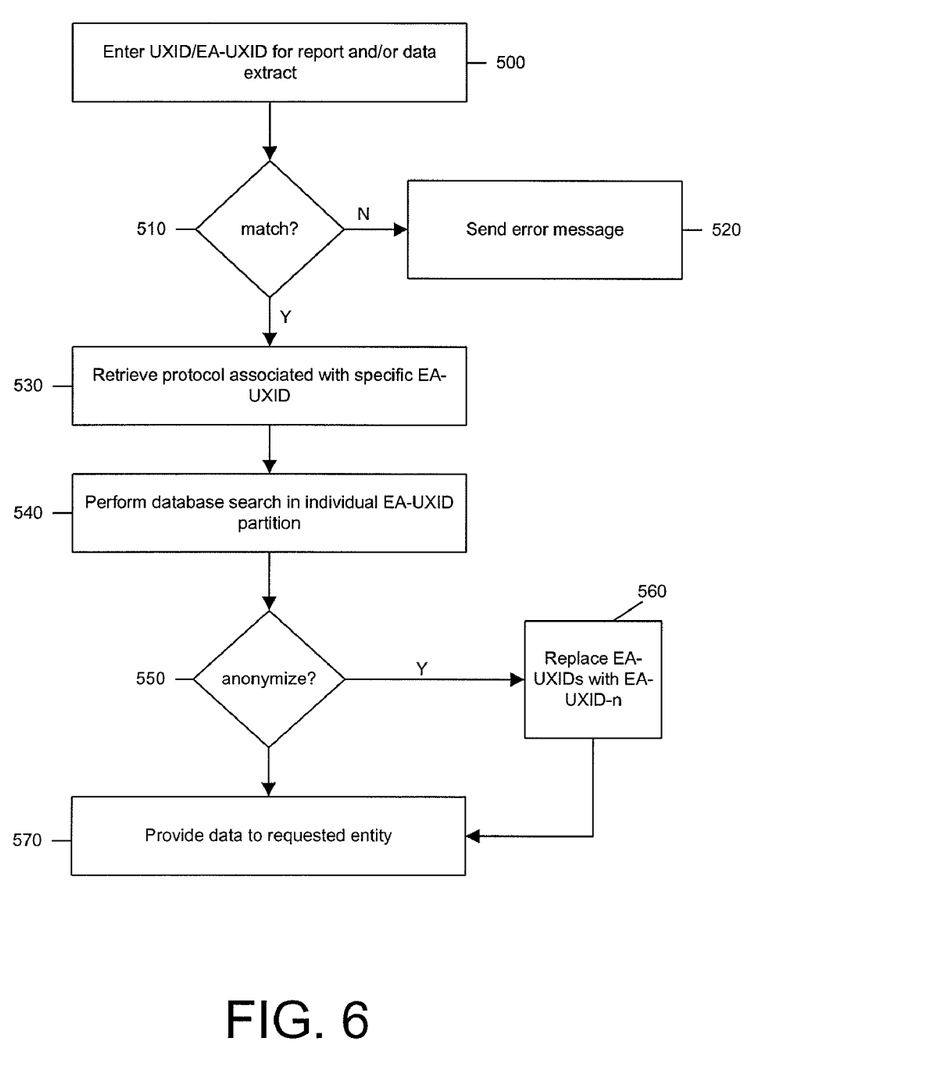
FIG. 6 contains a flowchart illustrating an exemplary process utilized by a registered entity to retrieve "anonymous" data collected by the service of the present invention.

FIG. 6 contains a flowchart illustrating one exemplary process that may be used by a registered entity to retrieve "anonymous" data collected by the service of the present invention. The process begins with the entity submitting its UXID and EA-UXID information so as to gain access to the stored data (step 500). The UXID platform will check this entered information against the entity data stored within partition 16, looking for a "match" (step 510) to valid the request to gain access to the data. If no match is found, an error message is sent to the requestor (step 520). Otherwise, the process continues at step 530 with the retrieval of the specific protocols associated with the requesting EA-UXID (that is, with the specific purpose of the requesting entity). As discussed above, the various protocols are stored, in linked fashion, within protocol database 28 of entity partition 16. For example, a drug company's EA-UXID may allow them to gain access to the results of a particular Study Group, with the "protocol" providing the results in a specific form. Once the protocol has been retrieved, the process continues (step 540) with a search of the individual EA-UXID records stored in database 22 of individual partition 14, where only the records having the same EA-UXID will be searched. In accordance with different protocols, further "anonymization" of data may be required (as discussed above in association with the need for different EA-UXID-n representations. A decision is made at this point (step 550) as to whether further anonymization is required. If it is, the various EA-UXIDs are replaced by the proper EA-UXID-n, shown as step 560. Otherwise, the data is prepared in the form required by the protocol and transmitted to the requesting entity (step 570).

Other and further modifications and embellishments to the anonymous data exchange and collection service of the present invention will become apparent to those skilled in the art. Indeed, the subject matter of the present invention is intended to be limited in scope only by the claims appended hereto.

What is claimed is:

1. A computer implemented method for controlling data access, comprising:
   receiving documentation identifying a user;
   defining a confidence level of an identity of the user based on the documentation identifying the user;
   generating, by a communication platform processor and using a hash algorithm stored in a hashing database, a set of identifiers, the set including a unique universal identifier (UXID) associated with the user and based at least in part on the confidence level;
   assigning, to the unique universal identifier (UXID), a graded user verification level that corresponds to the confidence level of the identity of the user based on the documentation identifying the user;
   creating a user account associated with the set of identifiers, the user account including the unique universal identifier (UXID) and at least one of user data and generated data;
   receiving a request to associate the user account with a subscriber-entity;
   generating, by the communication platform processor and responsive to the request to associate the user account with the subscriber-entity, a unique entity-associated universal identifier (EA-UXID) that identifies the subscriber-entity and is included within the set of identifiers;
   receiving a request from the subscriber-entity to access the user account;
   authorizing, by use of the communication platform processor, the request from the subscriber-entity based at least in part on an evaluation of the graded user verification level, and at least one of the unique entity-associated universal identifier (EA-UXID), and the unique universal identifier (UXID); and
   providing, by use of the communication platform processor, at least one of the user data and the generated data from at least one of an individual data database and an entity data database to the subscriber-entity.

2. The method of claim 1, wherein authorizing the request from the subscriber-entity further comprises an act of:
   authorizing, by use of the communication platform processor, the request from the subscriber-entity based at least in part on the confidence level.

3. The method of claim 1, comprising:
   generating the unique universal identifier (UXID) with the graded user verification level corresponding to the confidence level being one of a moderate confidence level, a high confidence level, and a very high confidence level based on the documentation identifying the user.

4. The method of claim 1, wherein generating the unique universal identifier (UXID) comprises:
   generating a provisional unique universal identifier based on the graded user verification level; and
   subsequent to generating the provisional unique universal identifier, generating a fully authorized unique universal identifier associated with the user, based on a change in the graded user verification level.

5. The method of claim 4, comprising:
   receiving additional documentation identifying the user; and
   identifying the change in the graded user verification level based on the additional documentation.

6. In a computer network, a data access control system, comprising:
   a universal identification communication platform including at least one processor and at least one database;
   the processor configured to receive documentation identifying a user and to define a confidence level of an identity of the user based on the documentation identifying the user; and
   the processor configured to generate a set of identifiers, the set including a unique universal identifier (UXID) associated with the user and based at least in part on the confidence level;
   the processor configured to assign a graded user verification level to the unique universal identifier (UXID) based on the documentation, wherein the graded user verification level corresponds to the confidence level of the identity of the user based on the documentation identifying the user;
   the processor configured to create a user account associated with the set of identifiers;
   the universal identification communication platform configured to receive a request to associate the user account with a subscriber-entity, and to generate a unique entity-associated universal identifier (EA-UXID) that identifies the subscriber-entity and is part of the set of identifiers;
   the database configured to store data associated with the user account, the data including user data and the graded user verification level;
   the processor configured to authorize a request from the subscriber-entity to access the user account based at least in part on the graded user verification level, and at least one of the unique entity-associated universal identifier (EA-UXID), and the unique universal identifier (UXID); and
   the universal identification communication platform configured to provide at least one of the user data and the data generated by the universal identification communication platform to the subscriber entity.

7. The system of claim 6, wherein the subscriber-entity is a school-entity and a second subscriber-entity is a medical-entity, and wherein the user is a student enrolled at the school and with the medical entity.

8. The system of claim 7, wherein the data associated with the user account includes school records of the student and medical records of the student.

9. The system of claim 8, wherein the universal identification communication platform is configured to provide at least one of the school records to the school-entity and to provide the medical records to the medical-entity.

10. The system of claim 9, wherein the universal identification communication platform is configured to prevent the school-entity from accessing the medical records and to prevent the medical-entity from accessing the school records.

11. The system of claim 6, comprising:
    the processor configured to assign a subscriber-entity verification level to the unique entity-associated universal identifier (EA-UXID) based on a characteristic of the subscriber-entity, wherein the subscriber-entity verification level defines a confidence level of authenticity of the subscriber-entity; and the processor configured to authorize the request from the subscriber-entity based at least in part on the subscriber-entity verification level.

12. The system of claim 6, comprising
the universal identification communication platform configured to generate an entity registration that defines different levels of access rights to the user account afforded to the subscriber-entity.

13. The system of claim 6, wherein the communication platform processor is configured to generate at least one of a report including aggregated user data of the user and a data extract including aggregated user data of the user.

14. The system of claim 6, wherein the subscriber-entity is a medical-entity and the user is a first patient enrolled in a drug study with the medical-entity, further comprising:
the universal identification communication platform configured to generate a second user unique universal identifier (UXID) associated with a second user account of a second user that is a second patient enrolled in the drug study;
the universal identification communication platform configured to aggregate data associated with the user account and data associated with the second user account, and grant access of the aggregated data to the medical-entity.

15. The system of claim 6, wherein the universal identification communication platform is configured to receive the request to associate the user account with a subscriber-entity from one of the user and the subscriber-entity.

16. The system of claim 6, comprising:
the universal identification communication platform configured to provide at least one of the user data and the data generated by the universal identification communication platform to the subscriber-entity in an anonymous fashion that does not reveal user identity.

17. The system of claim 6, wherein the subscriber-entity is a first subscriber-entity, further comprising the universal identification communication platform configured to:
generate a second unique entity-associated universal identifier (EA-UXID) that identifies a second subscriber-entity;
provide a first portion of the user data and the data generated by the universal identification communication platform to the first subscriber-entity;
provide a second portion of the user data and the data generated by the universal identification communication platform to the second-subscriber entity;
prevent the first subscriber-entity from accessing the second portion of the user data and the data generated by the universal identification communication platform; and
prevent the second subscriber-entity from accessing the first portion of the user data and the data generated by the universal identification communication platform.

18. The system of claim 11, comprising:
the processor configured to:
generate a provisional unique entity-associated universal identifier associated with the user and based on the subscriber-entity verification level; and
subsequently, to generate a fully authorized unique entity-associated universal identifier associated with the user, based on a change in the subscriber-entity verification level.

19. The system of claim 6, comprising:
the processor configured to:
generate a provisional unique universal identifier associated with the user and based on the graded user verification level; and
subsequently, to generate a fully authorized unique universal identifier associated with the user, based on a change in the graded user verification level.

20. The system of claim 6, comprising:
the processor configured to generate the unique universal identifier (UXID) with the graded user verification level corresponding to the confidence level being one of a moderate confidence level, a high confidence level, and a very high confidence level based on the documentation identifying the user.

21. An article of manufacture having stored thereon sequences of instructions including instructions that will cause a processor to:
receive documentation identifying a user;
define a confidence level of an identity of the user based on the documentation identifying the user;
generate a set of identifiers including a unique universal identifier (UXID) associated with the user and based at least in part on the confidence level;
assign a graded user verification level that corresponds to the confidence level of the identity of the user based on the documentation identifying the user;
create a user account associated with the set of identifiers, the user account including at least one of user data and generated data;
receive a request to associate the user account with a subscriber-entity;
generate, responsive to the request to associate the user account with the subscriber-entity, a unique entity-associated universal identifier (EA-UXID) that identifies the subscriber-entity and is included within the set of identifiers;
receive from the subscriber-entity a request to access the user account;
authorize the request from the subscriber-entity based at least in part on the graded user verification level, and at least one of the unique entity-associated universal identifier (EA-UXID), and the unique universal identifier (UXID); and
provide at least one of the user data and the generated data to the subscriber-entity.

22. The article of manufacture of claim 21, wherein the sequences of instructions including instructions that will cause the processor to:
generate a provisional unique universal identifier associated with the user and based on the graded user verification level; and
subsequently, to generate a fully authorized unique universal identifier associated with the user, based on a change in the graded user verification level.

23. The article of manufacture of claim 21, wherein the sequences of instructions include instructions that will cause the processor to:
generate the unique universal identifier (UXID) associated with the user with the graded user verification level corresponding to the confidence level being one of a moderate confidence level, a high confidence level, and a very high confidence level based on the documentation identifying the user.

* * * * *